United States Patent
Koike et al.

(10) Patent No.: US 11,149,999 B2
(45) Date of Patent: Oct. 19, 2021

(54) REFRIGERATION CYCLE APPARATUS HAVING FOREIGN SUBSTANCE RELEASE CONTROL

(71) Applicant: Mitsubishi Electric Corporation, Tokyo (JP)

(72) Inventors: Takanori Koike, Tokyo (JP); Osamu Morimoto, Tokyo (JP); Hiroyuki Okano, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 18 days.

(21) Appl. No.: 16/487,699

(22) PCT Filed: May 15, 2017

(86) PCT No.: PCT/JP2017/018184
§ 371 (c)(1),
(2) Date: Aug. 21, 2019

(87) PCT Pub. No.: WO2018/211556
PCT Pub. Date: Nov. 22, 2018

(65) Prior Publication Data
US 2020/0064040 A1 Feb. 27, 2020

(51) Int. Cl.
*F25B 49/02* (2006.01)
*F25B 5/02* (2006.01)
(Continued)

(52) U.S. Cl.
CPC .............. *F25B 49/022* (2013.01); *F25B 5/02* (2013.01); *F25B 13/00* (2013.01); *F25B 41/31* (2021.01);
(Continued)

(58) Field of Classification Search
CPC .............. F25B 2500/04; F25B 2500/08; F25B 2600/2513
See application file for complete search history.

(56) References Cited

U.S. PATENT DOCUMENTS

| | | | | |
|---|---|---|---|---|
| 5,186,207 A | * | 2/1993 | Kaneko | F25B 41/31 137/495 |
| 2012/0255318 A1 | | 10/2012 | Kido et al. | |
| 2016/0282026 A1 | * | 9/2016 | Park | F24F 1/22 |

FOREIGN PATENT DOCUMENTS

JP    5516602 B2    6/2014

OTHER PUBLICATIONS

International Search Report of the International Searching Authority dated Aug. 8, 2017 for the corresponding International application No. PCT/JP2017/018184 (and English translation).

* cited by examiner

*Primary Examiner* — Jonathan Bradford
(74) *Attorney, Agent, or Firm* — Posz Law Group, PLC

(57) ABSTRACT

A refrigeration cycle apparatus includes a refrigerant circuit, a controller, a bypass pipe, a refrigerant cooler, a second expansion device, and a controller temperature sensor. In a case where a temperature measured by the controller temperature sensor is lower than or equal to a set temperature in a state where an opening degree of the second expansion device is controlled to an instruction opening degree that is lower than or equal to a set opening degree, the controller is configured to perform foreign substance release control where the controller is configured to increase the opening degree of the second expansion device and then is configured to return the opening degree of the second expansion device to the instruction opening degree.

8 Claims, 6 Drawing Sheets

(51) Int. Cl.
*F25B 47/00* (2006.01)
*F25B 41/31* (2021.01)
*F25B 13/00* (2006.01)

(52) U.S. Cl.
CPC ...... *F25B 47/00* (2013.01); *F25B 2313/0233* (2013.01); *F25B 2400/04* (2013.01); *F25B 2500/04* (2013.01); *F25B 2600/0251* (2013.01); *F25B 2600/2513* (2013.01); *F25B 2700/2115* (2013.01); *F25B 2700/21153* (2013.01)

REFRIGERATION CYCLE APPARATUS HAVING FOREIGN SUBSTANCE RELEASE CONTROL

CROSS REFERENCE TO RELATED APPLICATION

This application is a U.S. national stage application of International Application No. PCT/JP2017/018184, filed on May 15, 2017, the contents of which are incorporated herein by reference.

TECHNICAL FIELD

The present invention relates to a refrigeration cycle apparatus where a controller is cooled by use of refrigerant.

BACKGROUND

The following technique of cooling a controller has been known. A portion of refrigerant is caused to bypass from a main stream in a high-pressure portion of a refrigerant circuit, and is caused to reject heat in a pre-cooling heat exchanger. Then, the refrigerant that has rejected heat is caused to flow through a refrigerant cooler to exchange heat with the controller, thus cooling the controller. The refrigerant flowing out from the refrigerant cooler flows to a pipe connected to a suction port of a compressor via an expansion device that controls a refrigerant flow rate in the refrigerant cooler. The controller includes a semiconductor element that generates heat, such as SiC, and a temperature of the controller increases due to heat generated by the semiconductor element. When the temperature of the controller increases, the expansion device increases an opening degree of the expansion device to start cooling. On the other hand, when the temperature of the controller decreases, the expansion device reduces the opening degree to a closed state.

A technique is known that suppresses condensation of dew in the refrigeration cycle apparatus at the time when the controller is cooled (see Patent Literature 1, for example). In the refrigeration cycle apparatus disclosed in Patent Literature 1, when the temperature of the controller reaches a fixed temperature or lower, the temperature of the controller is increased to prevent the condensation of dew. At this point of operation, the refrigerant flow rate in the refrigerant cooler is reduced, or the amount of heat generated at a power element is increased.

PATENT LITERATURE

Patent Literature 1: Japanese Patent No. 5516602

There may be a case where a gap located around a valve body portion of the expansion device, for example, is clogged with a foreign substance (dust clogging). In the refrigeration cycle system disclosed in Patent Literature 1, when the opening degree of the expansion device cannot be normally opened or closed, refrigerant that has a flow rate higher than or equal to a target refrigerant flow rate continues to flow. As a result, the controller is excessively cooled, so that dew may condense on the controller.

SUMMARY

The present invention has been made to overcome the above-mentioned problems, and it is an object of the present invention to provide a refrigeration cycle apparatus that has improved reliability of a cooling mechanism that cools a controller.

A refrigeration cycle apparatus of an embodiment of the present invention includes a refrigerant circuit through which refrigerant circulates, the refrigerant circuit including a compressor, a heat-source-side heat exchanger, a first expansion device, and a load-side heat exchanger; a bypass pipe branched from a pipe between the compressor and the first expansion device, and connected to a pipe connected to a suction port of the compressor; a second expansion device provided in the bypass pipe, the second expansion device being configured to regulate a flow rate of the refrigerant flowing through the bypass pipe; a refrigerant cooler through which the refrigerant flows, the refrigerant cooler being provided in the bypass pipe; a controller configured to control the compressor, the first expansion device, and the second expansion device, the controller being cooled by the refrigerant cooler; and a controller temperature sensor configured to measure a temperature of the controller. In a case where a temperature measured by the controller temperature sensor is lower than or equal to a set temperature in a state where an opening degree of the second expansion device is controlled to an instruction opening degree that is lower than or equal to a set opening degree, the controller is configured to perform foreign substance release control where the controller is configured to increase the opening degree of the second expansion device and then is configured to return the opening degree of the second expansion device to the instruction opening degree.

In the refrigeration cycle apparatus of an embodiment of the present invention, when it is determined that the second expansion device that regulates the refrigerant flow rate in the refrigerant cooler is clogged with a foreign substance, control is performed where the second expansion device is opened and closed to release the foreign substance. With such operations, the refrigeration cycle apparatus causes the second expansion device to perform a normal action again to prevent the controller from being excessively cooled. Consequently, it is possible to suppress condensation of dew.

DETAILED DESCRIPTION

An air-conditioning apparatus that is one example of a refrigeration cycle apparatus will be described hereinafter with reference to the drawings. In the description made hereinafter, the high level and the low level of a temperature, pressure or other aspect are not particularly determined by the relationship to an absolute value, but are relatively determined depending on the state, action, or other factor of the system, devices, or other units.

Embodiment 1

Figure 1:
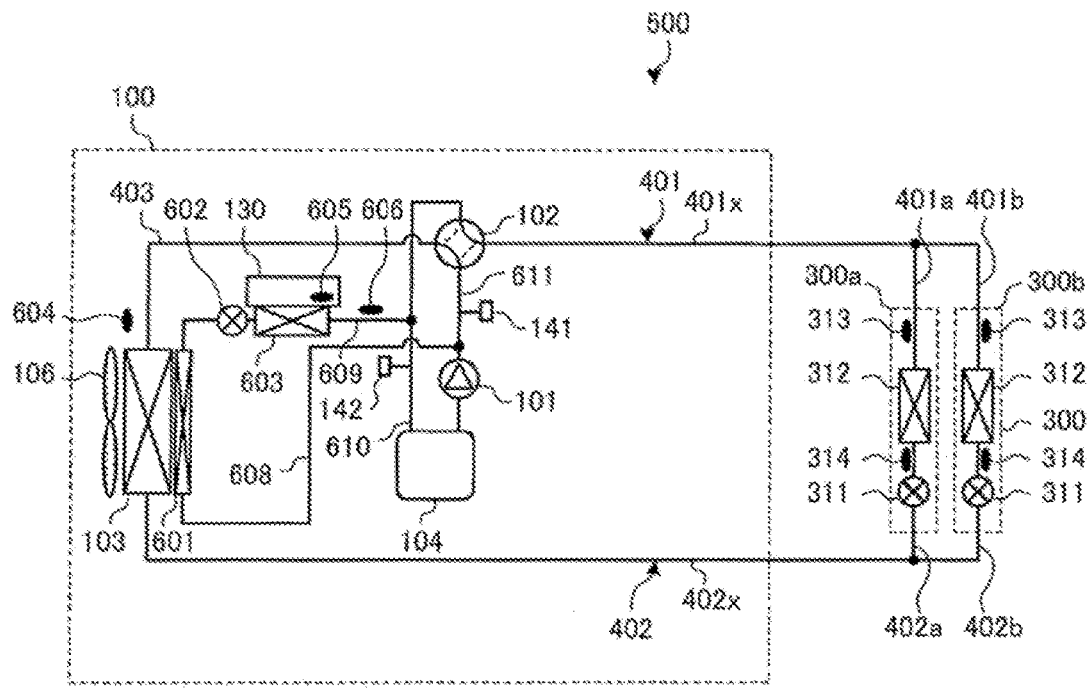
FIG. 1 is a schematic configuration diagram illustrating one example of a configuration of a refrigerant circuit of an air-conditioning apparatus 500 according to Embodiment 1 of the present invention.

FIG. 1 is a schematic configuration diagram illustrating one example of a configuration of a refrigerant circuit of an air-conditioning apparatus 500 according to an embodiment of the present invention. The air-conditioning apparatus 500 will be described with reference to FIG. 1. The air-conditioning apparatus 500 is installed in a building or an apartment, for example. The air-conditioning apparatus 500 can perform a cooling operation or a heating operation by making use of a refrigeration cycle (heat pump cycle) that causes refrigerant to circulate.

The air-conditioning apparatus 500 includes a heat-source-side unit 100, and a plurality of (two in FIG. 1) load-side units 300a, 300b. The heat-source-side unit 100 and the load-side units 300a, 300b are connected with each other via a gas extension pipe 401 and a liquid extension pipe 402. The gas extension pipe 401 is constituted of a gas main pipe 401x, a gas branch pipe 401a, and a gas branch pipe 401b. The liquid extension pipe 402 is constituted of a liquid main pipe 402x, a liquid branch pipe 402a, and a liquid branch pipe 402b.

[Heat-Source-Side Unit 100]

The heat-source-side unit 100 is configured to supply cooling energy or heating energy to load-side units 300.

The heat-source-side unit 100 includes a compressor 101, a flow switching device 102, a heat-source-side heat exchanger 103, and an accumulator 104. These devices are connected in series.

The compressor 101 suctions low temperature and low pressure refrigerant, compresses the refrigerant into high temperature and high pressure gas refrigerant and, then, discharges the refrigerant. It is preferable that the compressor 101 be an inverter compressor capable of controlling capacity, for example. The compressor 101 is not limited to the inverter compressor capable of controlling capacity. The compressor 101 may be a constant-speed compressor, or a compressor obtained by combining an inverter compressor and a constant-speed compressor, for example. It is sufficient that the compressor 101 can compress suctioned refrigerant into a high pressure state. The compressor 101 may be a reciprocating compressor, a rotary compressor, a scroll compressor, or a screw compressor, for example.

The flow switching device 102 is a four-way valve, for example. The flow switching device 102 is provided in a pipe connected to a discharge port of the compressor 101, and switches a refrigerant flow passage between the cooling operation and the heating operation. The flow switching device 102 controls a flow of refrigerant in such a manner that the heat-source-side heat exchanger 103 is used as an evaporator or a condenser corresponding to the operation mode.

The heat-source-side heat exchanger 103 is a fin tube heat exchanger, and exchanges heat between a heat medium, such as ambient air and water, and refrigerant, for example. During the heating operation, the heat-source-side heat exchanger 103 is used as an evaporator so that the heat-source-side heat exchanger 103 causes refrigerant to be evaporated and gasified. On the other hand, during the cooling operation, the heat-source-side heat exchanger 103 is used as a condenser or a radiator so that the heat-source-side heat exchanger 103 condenses and liquefies refrigerant.

A heat-source-side fan 106 is mounted on the heat-source-side unit 100. Condensation capacity or evaporation capacity of the heat-source-side heat exchanger 103 is controlled by controlling the rotation frequency of the heat-source-side fan 106. In the case where the heat-source-side heat exchanger 103 is a water-cooled heat exchanger, the rotation frequency of a water circulation pump (not illustrated in the drawing) is controlled to control the condensation capacity or the evaporation capacity of the heat-source-side heat exchanger 103.

The accumulator 104 is provided in a pipe connected to a suction port of the compressor 101. The accumulator 104 is configured to separate liquid refrigerant and gas refrigerant from each other, and is configured to store surplus refrigerant.

The air-conditioning apparatus 500 also includes a high pressure sensor 141 and a low pressure sensor 142. The high pressure sensor 141 measures pressure (high pressure) of refrigerant discharged from the compressor 101. The low pressure sensor 142 measures pressure (low pressure) of refrigerant to be suctioned into the compressor 101. The air-conditioning apparatus 500 further includes an outside air temperature sensor 604 that measures an outside air temperature. Information on the high pressure measured by the high pressure sensor 141, the low pressure measured by the low pressure sensor 142, and the outside air temperature measured by the outside air temperature sensor 604 is sent to a controller 130 that controls the action of the air-conditioning apparatus 500.

The air-conditioning apparatus 500 includes a bypass pipe 608. The bypass pipe 608 branches from a high pressure pipe 611 connecting the compressor 101 and the flow switching device 102 with each other, and is connected to a low-pressure pipe 610 disposed in the pipe connected to the suction port of the compressor 101. The bypass pipe 608 allows high pressure gas refrigerant discharged from the compressor 101 to bypass. A pre-cooling heat exchanger 601 is provided in the bypass pipe 608. The pre-cooling heat exchanger 601 cools the high pressure gas refrigerant flowing into the bypass pipe 608. The pre-cooling heat exchanger 601 is integrated into a heat exchanger, together with the heat-source-side heat exchanger 103. The pre-cooling heat exchanger 601 is a portion of the integral heat exchanger. The pre-cooling heat exchanger 601 may be provided as a separate body from the heat-source-side heat exchanger 103. A second expansion device 602 and a refrigerant cooler 603 are provided downstream of the pre-cooling heat exchanger 601. The second expansion device 602 regulates a bypass flow rate. The refrigerant cooler 603 cools the controller 130.

The second expansion device 602 is configured to be used as a pressure reducing valve or an expansion valve. The second expansion device 602 reduces the pressure of refrigerant thus causing the refrigerant to expand. The second expansion device 602 reduces the pressure of high-pressure refrigerant cooled by the pre-cooling heat exchanger 601 to further reduce the temperature of the refrigerant, and causes the refrigerant to flow into the refrigerant cooler 603 in such a state. The second expansion device 602 is a device capable of variably controlling an opening degree of the device, such as an electronic expansion valve, for example.

The refrigerant cooler 603 cools the controller 130, and includes a refrigerant pipe through which refrigerant passes. The refrigerant pipe is disposed in such a manner that the refrigerant pipe is in contact with the controller 130.

The refrigerant flowing into the bypass pipe 608 is cooled by the pre-cooling heat exchanger 601, thus changing into liquid refrigerant. The liquid refrigerant flows into the refrigerant cooler 603 after a flow rate of the liquid refrigerant is regulated by the second expansion device 602. The liquid refrigerant flowing into the refrigerant cooler 603 receives heat generated from the controller 130, thus changing into gas refrigerant. The refrigerant that has changed into the gas refrigerant flows through a refrigerant cooler downstream pipe 609 disposed downstream of the controller 130, passes through the low-pressure pipe 610, and flows into the accumulator 104.

The heat-source-side unit 100 also includes a controller temperature sensor 605 and a bypass temperature sensor 606. The controller temperature sensor 605 measures the temperature of the controller 130. The bypass temperature sensor 606 measures the temperature of a pipe disposed downstream of the refrigerant cooler 603. Information on the temperature of the controller 130 measured by the controller temperature sensor 605 and the temperature of a portion of the bypass pipe 608 measured by the bypass temperature sensor 606 is also sent to the controller 130.

[Load-Side Units 300a, 300b]

The load-side units 300a, 300b supply cooling energy or heating energy from the heat-source-side unit 100 to a cooling load or to a heating load. A load-side heat exchanger 312 and a first expansion device 311 are mounted on each of the load-side units 300a, 300b in such a manner that the load-side heat exchanger 312 and the first expansion device 311 are connected in series. The load-side units 300a, 300b form a refrigerant circuit in cooperation with the heat-source-side unit 100. It is preferable to provide an air-sending device not illustrated in the drawing for supplying air to each of the load-side heat exchangers 312. The load-side heat exchangers 312 may each exchange heat between refrigerant and a heat medium different from refrigerant, such as water.

The load-side heat exchangers 312 each exchange heat between a heat medium (ambient air or water, for example) and refrigerant. During the heating operation, the load-side heat exchangers 312 are each used as a condenser (radiator), and each condense and liquefy refrigerant. During the cooling operation, the load-side heat exchangers 312 are each used as an evaporator, thus causing refrigerant to be evaporated and gasified. The load-side heat exchangers 312 are each typically provided in combination with the air-sending device, which is not illustrated in the drawing. Condensation capacity or evaporation capacity of each of the load-side heat exchangers 312 is controlled by controlling the rotation frequency of the air-sending device.

The first expansion devices 311 are each configured to be used as a pressure reducing valve. The first expansion devices 311 each reduce the pressure of refrigerant thus causing the refrigerant to expand. It is preferable that the first expansion devices 311 be each a device that is capable of variably controlling an opening degree of the device, such as an electronic expansion valve, or be each an inexpensive refrigerant flow rate regulating unit, such as a capillary, for example.

At least a first temperature sensor 313 and a second temperature sensor 314 are provided in each of the load-side units 300. The first temperature sensors 313 each measure the temperature of a refrigerant pipe at a position between the corresponding one of the load-side heat exchangers 312 and the flow switching device 102. The second temperature sensors 314 each measure the temperature of a refrigerant pipe at a position between the corresponding one of the first expansion devices 311 and the corresponding one of the load-side heat exchangers 312. Information on the temperatures measured by the first temperature sensors 313 and the second temperature sensors 314 is sent to the controller 130. Information from the first temperature sensors 313 and the second temperature sensors 314 is utilized for controlling the opening degree of each of the first expansion devices 311 provided in the respective load-side units 300, the rotation frequency of the air-sending device not illustrated in the drawing, and other aspect.

In this embodiment, the kind of refrigerant used for the air-conditioning apparatus 500 is not particularly limited. Any refrigerant may be used. Natural refrigerants, such as carbon dioxide, hydrocarbon, and helium, alternative refrigerants containing no chlorine, such as HFC410A, HFC407C, and HFC404A, or fluorocarbon-based refrigerants used in existing products, such as R22 and R134a, for example, may be used.

The controller 130 controls the air-conditioning apparatus 500 in such a manner that the controller 130 mainly controls devices that the heat-source-side unit 100 includes. In this embodiment, the controller 130 is a microcomputer, for example. The controller 130 includes a memory that stores data where processing procedures of controls or other operation are stored as a program. By executing the program stored in the memory, the devices included in the heat-source-side unit 100 are controlled.

FIG. 1 shows a case where the controller 130 is mounted on the heat-source-side unit 100 as an example. However, the controller 130 may be provided to one of the load-side units 300. The controller 130 may be provided to the outside of the heat-source-side unit 100 and the load-side units 300. It may be also possible to adopt a configuration where the controller 130 is divided into a plurality of controllers by function, and the divided controllers are provided to each of the heat-source-side unit 100 and any of the load-side units 300. In this case, it is preferable that the respective controllers be connected with each other wirelessly or with a wire to allow communication.

Figure 2:
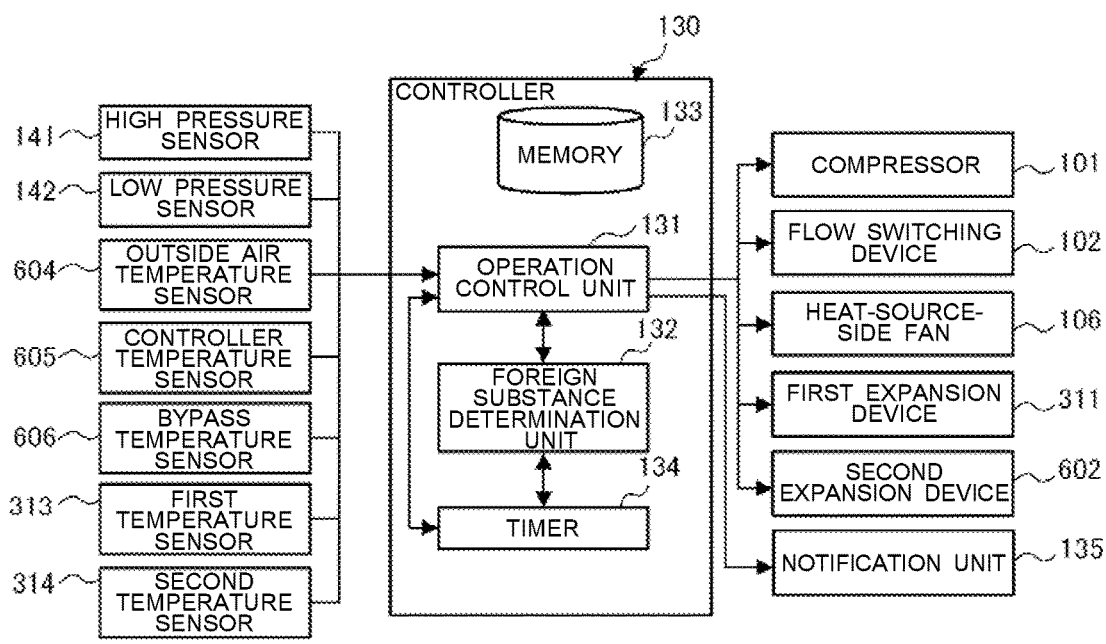
FIG. 2 is a function block diagram illustrating a function of a controller of the air-conditioning apparatus 500 according to Embodiment 1 of the present invention.

FIG. 2 is a function block diagram illustrating the function of the controller 130 of the air-conditioning apparatus 500 according to Embodiment 1 of the present invention. The controller 130 includes an operation control unit 131, a foreign substance determination unit 132, a memory 133 and other units. The controller 130 also includes a timer 134 that counts a time period.

The operation control unit 131 controls an air conditioning operation of the air-conditioning apparatus 500. The operation control unit 131 acquires measurement information, such as pressure information from the high pressure sensor 141 and the low pressure sensor 142 and temperature information from the outside air temperature sensor 604, the controller temperature sensor 605, the bypass temperature sensor 606, the first temperature sensors 313, and the second temperature sensors 314. Further, instruction from a user is input into the operation control unit 131 via a remote controller or other device not illustrated in the drawing. The operation control unit 131 controls various actuators corresponding to measurement information acquired from the various sensors, instruction, set information set in advance and other information. Specifically, the operation control unit 131 controls driving frequency of the compressor 101, the rotation frequency of the heat-source-side fan 106, switching of the flow switching device 102, or other operation corresponding to the high pressure and the low pressure. The operation control unit 131 also controls the second expansion device 602 corresponding to the high pressure, the low pressure, the outside air temperature, the temperature of the controller 130, and other factors.

The foreign substance determination unit 132 acquires the information on the temperature of the controller 130 and the opening degree of the second expansion device 602 from the operation control unit 131, and determines whether or not the second expansion device 602 is clogged with a foreign substance on the basis of the acquired information. Specifically, when the temperature of the controller 130 reaches a set temperature or lower in a case where the opening degree of the second expansion device 602 is instructed to an instruction opening degree that is lower than or equal to a set opening degree, the foreign substance determination unit 132 determines that the second expansion device 602 is clogged with a foreign substance. When the foreign substance determination unit 132 determines that the second expansion device 602 is clogged with a foreign substance, the foreign substance determination unit 132 notifies the operation control unit 131 of the clogging and, then, the operation control unit 131 performs foreign substance release control. The foreign substance release control is control where the opening degree of the second expansion device 602 is increased, and then is returned to an original instruction opening degree.

The memory 133 stores various set values to be referred to by the operation control unit 131 for performing control of actuators, various set values to be referred to by the foreign substance determination unit 132 for performing determination, and other values.

The air-conditioning apparatus 500 also includes a notification unit 135 that includes an indicator lamp, a monitor, or other part. The notification unit 135 is connected to the controller 130. When the notification unit 135 receives error information or other information output from the controller 130, the notification unit 135 notifies a user of an error by, for example, turning on the indicator lamp or by displaying a message.

Next, an operation action performed by the air-conditioning apparatus 500 will be described. The air-conditioning apparatus 500 receives a cooling request or a heating request from a remote controller or other device installed in the room, for example. The air-conditioning apparatus 500 performs either one of air conditioning actions selected from two operation modes corresponding to the request. The two operation modes include a cooling operation mode and a heating operation mode.

[Cooling Operation Mode]

Figure 3:
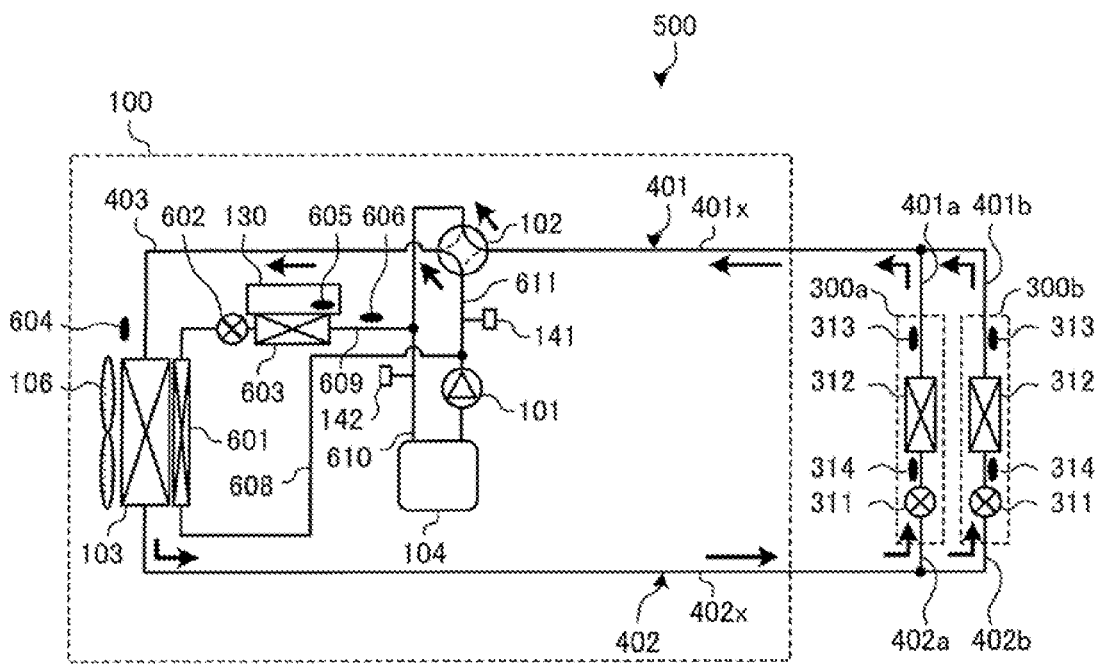
FIG. 3 is a diagram illustrating a flow of refrigerant in a case where the air-conditioning apparatus 500 according to Embodiment 1 of the present invention is in a cooling operation mode.

FIG. 3 is a diagram illustrating a flow of refrigerant in a case where the air-conditioning apparatus 500 according to the embodiment of the present invention is in the cooling operation mode. An operation action of the air-conditioning apparatus 500 during the cooling operation mode will be described with reference to FIG. 3.

The compressor 101 compresses low temperature and low pressure refrigerant, and discharges high temperature and high pressure gas refrigerant. The high temperature and high pressure gas refrigerant discharged from the compressor 101 passes through the flow switching device 102, and flows into the heat-source-side heat exchanger 103. The heat-source-side heat exchanger 103 is used as a condenser and hence, the refrigerant exchanges heat with ambient air, thus being condensed and liquefied. Liquid refrigerant flowing out from the heat-source-side heat exchanger 103 flows out from the heat-source-side unit 100 through the liquid main pipe 402x.

High-pressure liquid refrigerant flowing out from the heat-source-side unit 100 flows into the load-side units 300a, 300b through the respective liquid branch pipes 402a, 402b. The liquid refrigerant flowing into the load-side units 300a, 300b is throttled by the corresponding one of the first expansion devices 311, thus changing into two-phase gas-liquid refrigerant with low temperature. The two-phase gas-liquid refrigerant with low temperature flows into each of the load-side heat exchangers 312. The load-side heat exchangers 312 are each used as an evaporator and hence, the refrigerant exchanges heat with ambient air, thus being evaporated and gasified. At this point of operation, the refrigerant receives heat from the surrounding environment so that the room is cooled. Then, the refrigerant flowing out from the load-side heat exchangers 312 flows out from the load-side units 300a, 300b through the respective gas branch pipes 401a, 401b.

The refrigerant flowing out from the load-side units 300a and 300b returns to the heat-source-side unit 100 through the gas main pipe 401x. The gas refrigerant returning to the heat-source-side unit 100 is suctioned again by the compressor 101 via the flow switching device 102 and the accumulator 104.

[Heating Operation Mode]

Figure 4:
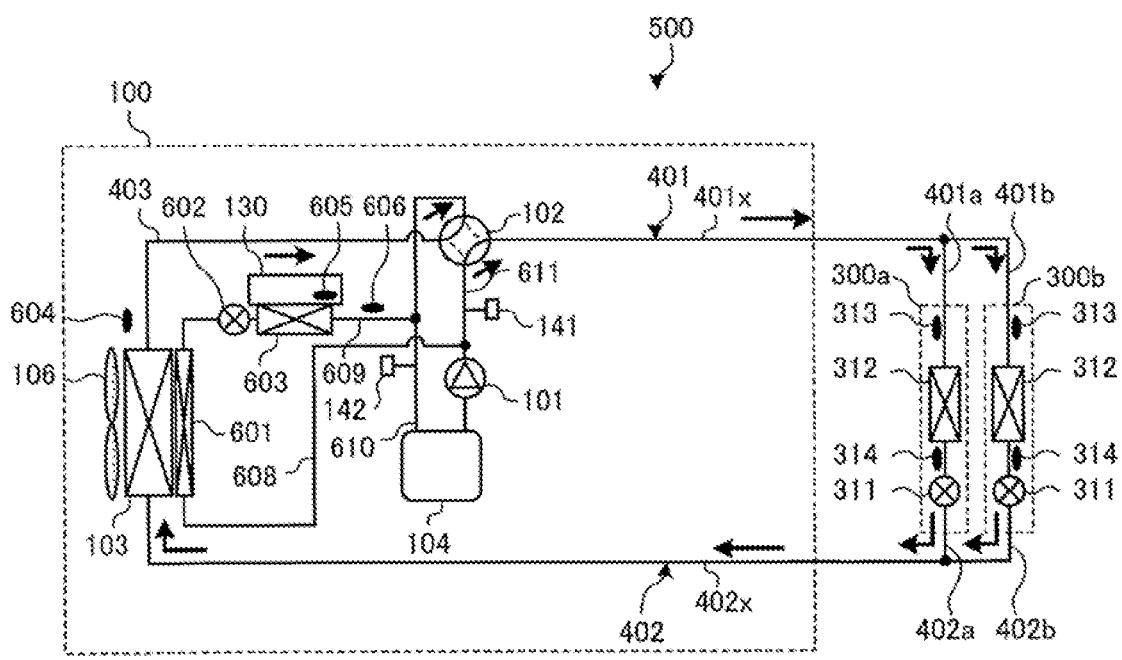
FIG. 4 is a refrigerant circuit diagram illustrating the flow of refrigerant in a case where the air-conditioning apparatus 500 according to Embodiment 1 of the present invention is in a heating operation mode.

FIG. 4 is a refrigerant circuit diagram illustrating the flow of refrigerant in a case where the air-conditioning apparatus 500 according to the embodiment of the present invention is in the heating operation mode. The operation action of the air-conditioning apparatus 500 during the heating operation mode will be described with reference to FIG. 4.

Low temperature and low pressure refrigerant is compressed by the compressor 101, thus changing into high temperature and high pressure gas refrigerant, and is then discharged. The high temperature and high pressure gas refrigerant discharged from the compressor 101 passes through the flow switching device 102, and flows into the high pressure pipe. Then, this refrigerant flows out from the heat-source-side unit 100. The high temperature and high pressure gas refrigerant flowing out from the heat-source-side unit 100 flows into the load-side units 300a, 300b through the respective gas branch pipes 401a, 401b.

The gas refrigerant flowing into the load-side units 300a, 300b flows into the respective load-side heat exchangers 312. The load-side heat exchangers 312 are each used as a condenser and hence, the refrigerant exchanges heat with ambient air, thus being condensed and liquefied. At this point of operation, the refrigerant rejects heat to the surrounding environment and hence, an air-conditioned space, such as a room, is heated. Then, liquid refrigerant flowing out from each of the load-side heat exchangers 312 is reduced in pressure by the corresponding one of the first expansion devices 311, and flows out from the load-side units 300a, 300b through the respective liquid branch pipe 402a, 402b.

The refrigerant flowing out from the load-side units 300a, 300b returns to the heat-source-side unit 100 through the liquid main pipe 402x. The gas refrigerant returning to the heat-source-side unit 100 flows into the heat-source-side heat exchanger 103. The heat-source-side heat exchanger 103 is used as an evaporator and hence, the refrigerant exchanges heat with ambient air, thus being evaporated and gasified. Then, the refrigerant flowing out from the heat-source-side heat exchanger 103 flows into the accumulator 104 via the flow switching device 102. The compressor 101 suctions the refrigerant in the accumulator 104, and causes the refrigerant to circulate in the refrigerant circuit. The refrigeration cycle is established in this manner.

[Refrigerant Cooling Control]

Figure 5:
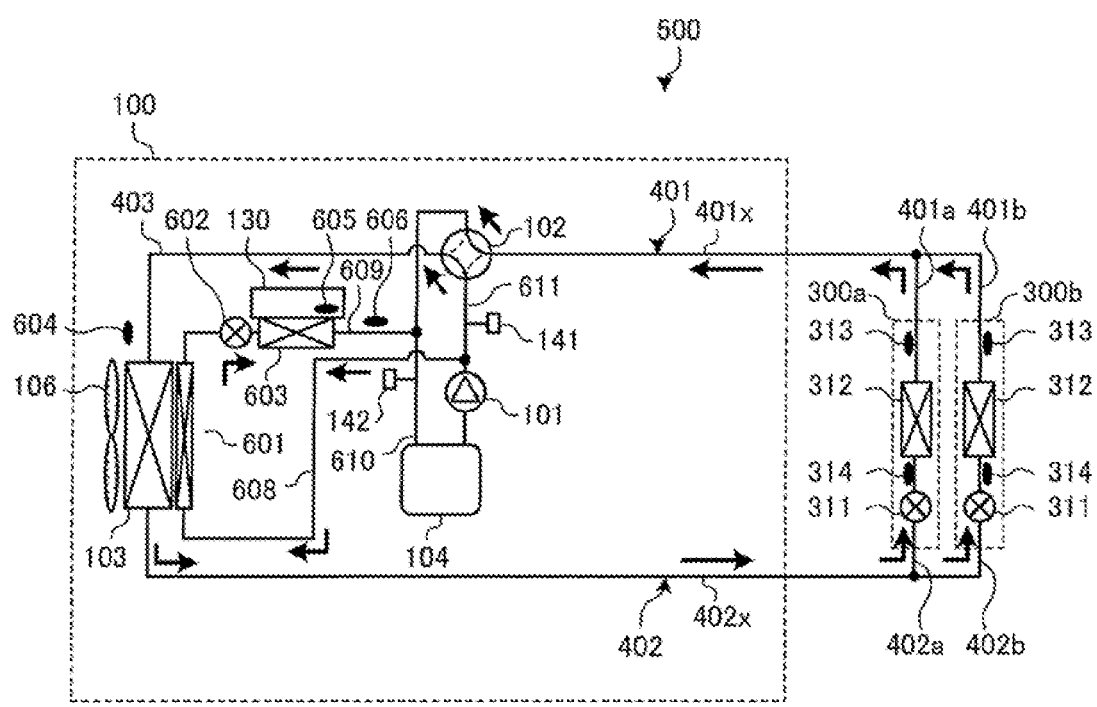
FIG. 5 is a refrigerant circuit diagram illustrating the flow of refrigerant during refrigerant cooling control in the case where the air-conditioning apparatus 500 according to Embodiment 1 of the present invention is in the cooling operation mode.

FIG. 5 is a refrigerant circuit diagram illustrating the flow of refrigerant during refrigerant cooling control in the case where the air-conditioning apparatus 500 according to the embodiment of the present invention is in the cooling operation mode. The refrigerant cooling control that is one example of a case where this embodiment is applied will be described. The same refrigerant cooling control where the controller 130 is cooled with refrigerant is performed in both operation modes, the cooling operation mode and the heating operation mode. For this reason, hereinafter, the refrigerant cooling control will be described with reference to a diagram illustrating the flow of refrigerant during the cooling operation mode.

A portion of high pressure gas refrigerant discharged from the compressor 101 is caused to flow into the bypass pipe 608 to bypass, and then flows into the pre-cooling heat exchanger 601. The gas refrigerant flowing into the pre-cooling heat exchanger 601 exchanges heat with air from the heat-source-side fan 106 so that the gas refrigerant is cooled. The refrigerant cooled by the pre-cooling heat exchanger 601, thus changing into liquid refrigerant having a low pressure, is reduced in pressure by the second expansion device 602, thus having a lower pressure. Then, the liquid refrigerant flows into the refrigerant cooler 603. The refrigerant in the refrigerant cooler 603 exchanges heat with the controller 130, thus being evaporated. At this point of operation, the refrigerant receives heat from the controller 130, thus cooling the controller 130. The refrigerant used for cooling the controller 130 changes into gas refrigerant or two-phase refrigerant. The refrigerant flows through the low-pressure pipe 610, and flows into the accumulator 104.

The flow rate of refrigerant flowing through the refrigerant cooler 603 is regulated by the second expansion device 602. The second expansion device 602 is controlled by the controller 130 on the basis of information acquired from the low pressure sensor 142, the controller temperature sensor 605, the bypass temperature sensor 606, and the outside air temperature sensor 604. Hereinafter, specific control of the second expansion device 602 will be described.

Figure 6:
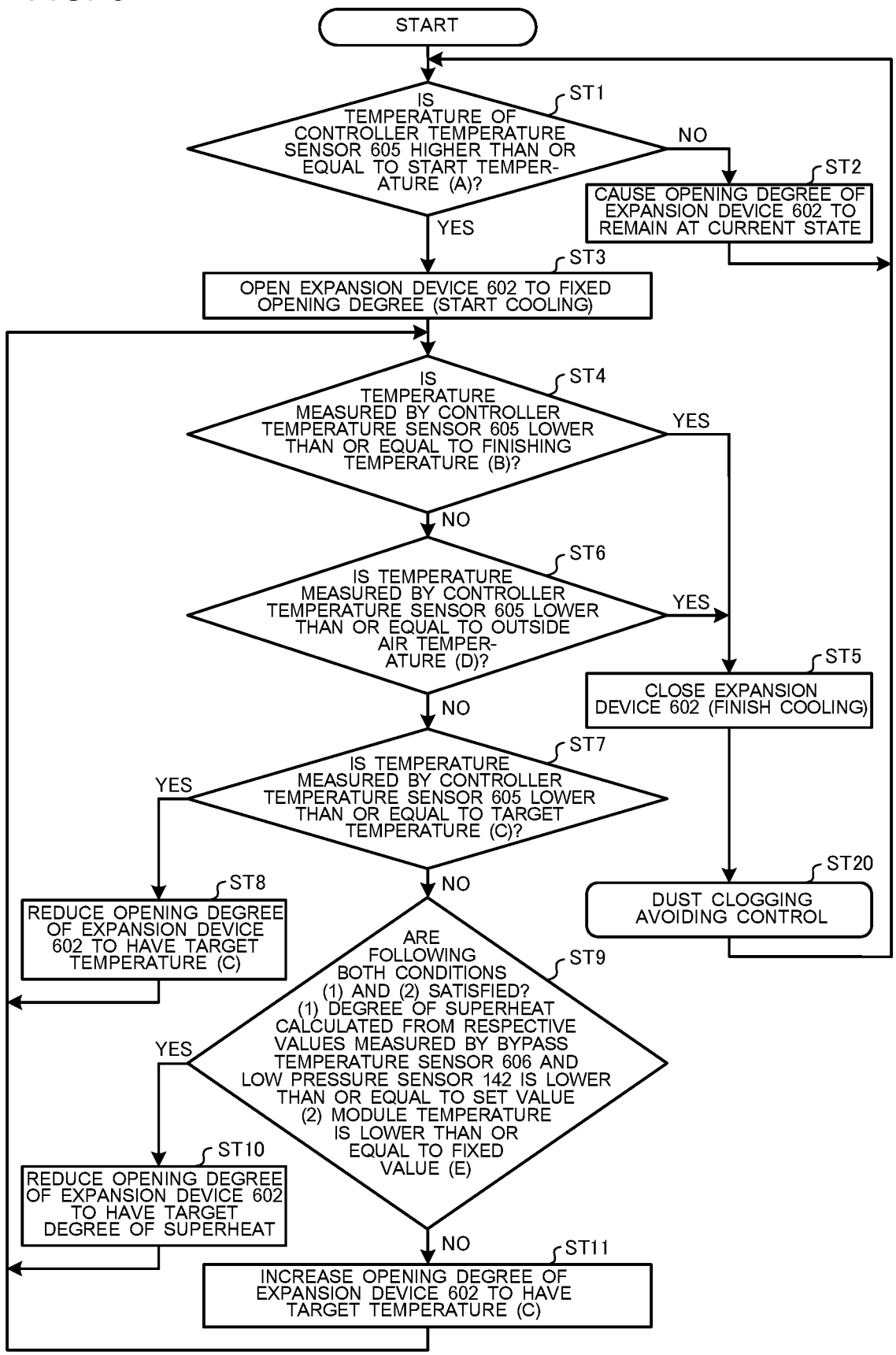
FIG. 6 is a flowchart illustrating control of a second expansion device 602 during the refrigerant cooling control of the air-conditioning apparatus 500 according to Embodiment 1 of the present invention.
Figure 7:
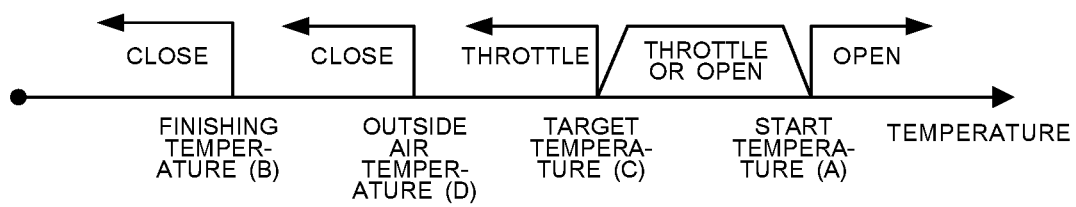
FIG. 7 is a diagram summarizing an action of the second expansion device 602 in the flowchart illustrated in FIG. 6.

Next, control and action of the second expansion device 602 at the time of cooling the controller 130 will be described with reference to FIG. 6 and FIG. 7. FIG. 6 is a flowchart illustrating control of the second expansion device 602 at the time of performing the refrigerant cooling control of the air-conditioning apparatus 500 according to Embodiment 1 of the present invention. FIG. 7 is a diagram summarizing an action of the second expansion device 602 in the flowchart illustrated in FIG. 6. In the description made hereinafter, (A) to (F) indicating temperatures have a relationship of dew point temperature (F)<finishing temperature (B)<outside air temperature (D)<target temperature (C)<fixed value (E)<start temperature (A). The refrigerant cooling control illustrated in FIG. 6 is mainly performed by the operation control unit 131 of the controller 130.

The second expansion device 602 is in a closed state at an initial state. After the operation of the air-conditioning apparatus 500 is started, the controller 130 determines whether or not the temperature measured by the controller temperature sensor 605 is higher than or equal to the start temperature (A) (75 degrees C., for example) set in advance (step ST1). When the measured temperature is lower than the start temperature (A), it is unnecessary to cool the controller 130 and hence, the opening degree of the second expansion device 602 remains in the closed state (step ST2) to prevent refrigerant from flowing into the refrigerant cooler 603. On the other hand, when the temperature measured by the controller temperature sensor 605 is higher than or equal to the start temperature (A), the controller 130 opens the second expansion device 602 to a fixed opening degree set in advance (step ST3). With such operations, the refrigerant flows into the refrigerant cooler 603 so that cooling of the controller 130 is started and hence, the temperature of the controller 130 decreases.

Then, the controller 130 determines whether or not the temperature measured by the controller temperature sensor 605 is lower than or equal to the finishing temperature (B) (45 degrees C., for example) set in advance (step ST4). When the temperature measured by the controller temperature sensor 605 is lower than or equal to the finishing temperature (B), the controller 130 closes the second expansion device 602 to finish cooling of the controller 130 (step ST5). On the other hand, when the temperature measured by the controller temperature sensor 605 is higher than the finishing temperature (B), it is still necessary to continue cooling of the controller 130. To prevent condensation of dew on the controller 130, it is determined whether or not the temperature measured by the controller temperature sensor 605 is lower than or equal to the outside air temperature (D) (step ST6).

When the temperature measured by the controller temperature sensor 605 becomes lower than or equal to the outside air temperature (D), there is a possibility that dew starts condensing on the controller 130. Consequently, the controller 130 closes the second expansion device 602 to finish cooling of the controller 130 (step ST5). On the other hand, when the temperature measured by the controller temperature sensor 605 is higher than the outside air temperature (D), to regulate the opening degree, it is determined whether or not the temperature measured by the controller temperature sensor 605 is lower than or equal to the target temperature (C) (60 degrees C., for example) set in advance (step ST7).

When the temperature measured by the controller temperature sensor 605 is lower than or equal to the target temperature (C), the controller 130 reduces the opening degree of the second expansion device 602 thus causing the temperature of the controller 130 to reach the target temperature (C) (step ST8) and, then, the processing returns to the determination in step ST4. When the temperature measured by the controller temperature sensor 605 is equal to the target temperature (C), a current opening degree may be maintained. On the other hand, when the temperature measured by the controller temperature sensor 605 is higher than the target temperature (C), the controller 130 determines whether or not the following both conditions (1) and (2) are satisfied (step ST9).

(1) The degree of superheat at the outlet of the refrigerant cooler 603 calculated from respective values measured by the bypass temperature sensor 606 and the low pressure sensor 142 is lower than or equal to a set value (2 degrees C., for example) set in advance.

(2) A module temperature is lower than or equal to the fixed value (E) (70 degrees C., for example).

The determination in step ST9 is performed for the following purposes. That is, the opening degree of the second expansion device 602 is controlled to reduce the temperature measured by the controller temperature sensor 605 to the target temperature (C) or lower. In such a case, when the amount of refrigerant passing through the bypass pipe 608 is large for the temperature of the controller 130, the degree of superheat at the outlet of the refrigerant cooler 603 decreases. Consequently, cooling capacity becomes excessively large, so that there is a possibility that a liquid-back phenomenon occurs. The determination in step ST9 is performed for preventing this liquid-back phenomenon. It should be noted that the condition (2) may be omitted.

That is, in a case where both conditions (1) and (2) are satisfied, when cooling operation is continued, there is a possibility that the liquid-back phenomenon occurs. Consequently, when it is determined that both conditions (1) and (2) are satisfied, the controller 130 reduces the opening degree of the second expansion device 602, so that the degree of superheat at the outlet of the refrigerant cooler 603 reaches a target degree of superheat (step ST10). Reducing the opening degree of the second expansion device 602 as described above reduces the amount of refrigerant passing through the bypass pipe 608 and hence, the degree of superheat at the outlet of the refrigerant cooler 603 is increased so that the liquid-back phenomenon can be prevented. On the other hand, when either or both of conditions (1) and (2) are not satisfied, a cooling state where the liquid-back phenomenon may occur is not brought and hence, cooling operation is continued. That is, the controller 130 increases the opening degree of the second expansion device 602 so that the temperature measured by the controller temperature sensor 605 reaches the target temperature (C) (step ST11). Then, the processing returns to step ST4, and the same processing is repeated.

The controller 130 is cooled with the above-mentioned refrigerant cooling control. In this embodiment, liquid-back-phenomenon prevention determination in step ST9 is performed when the temperature measured by the controller temperature sensor 605 is higher than the target temperature (C), and is lower than the start temperature (A). When both conditions in step ST9 are not satisfied, there is no possibility that the degree of superheat becomes lower than or equal to the set value, or control of throttling the second expansion device 602 is performed. Consequently, it is unnecessary to perform the liquid-back-phenomenon prevention determination.

Figure 8:
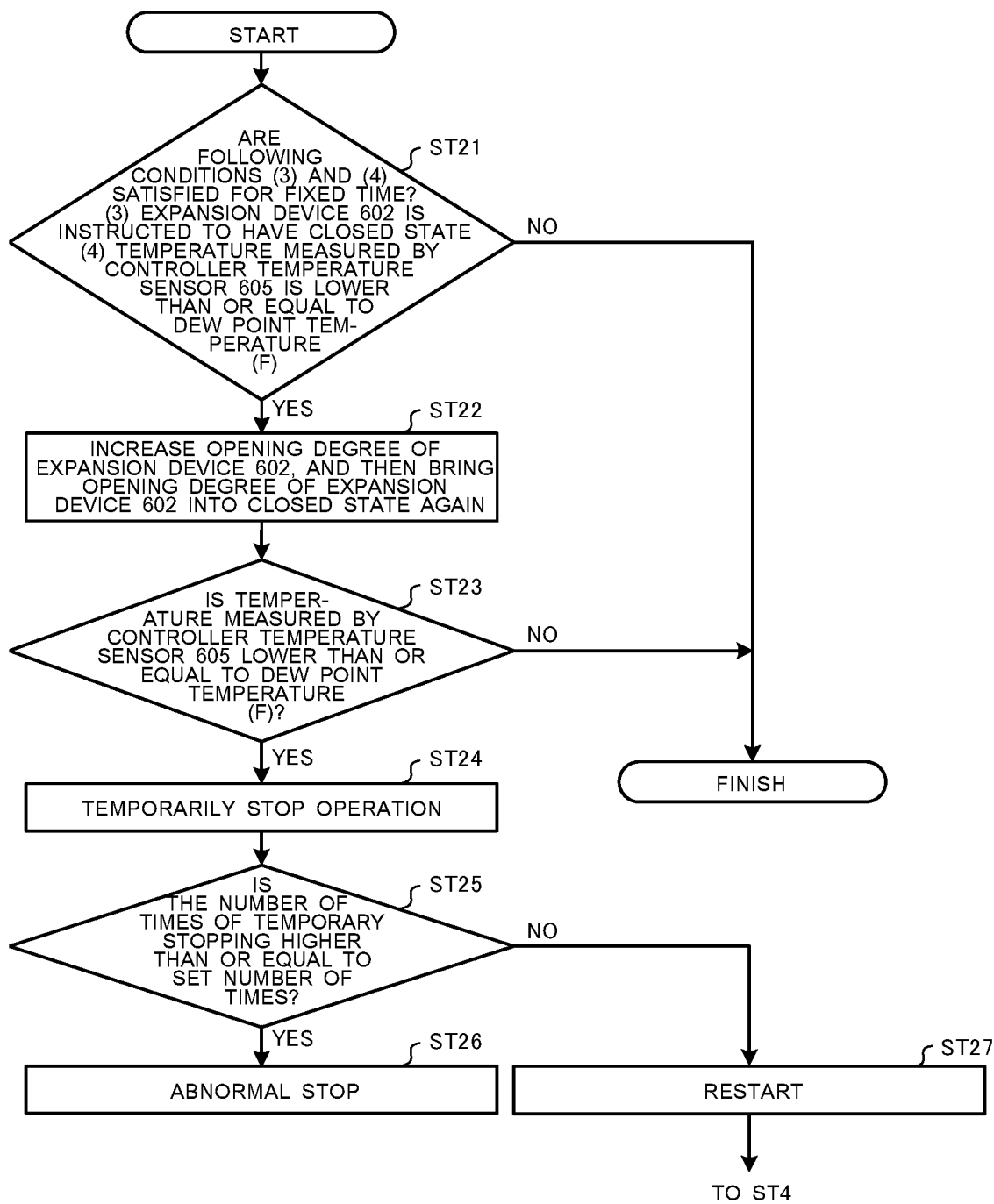
FIG. 8 is a flowchart illustrating control of the second expansion device 602 during dust clogging avoiding control of the air-conditioning apparatus 500 according to Embodiment 1 of the present invention.

Next, dust clogging avoiding control will be described with reference to FIG. 8. Dust clogging avoiding control is performed in the above-mentioned refrigerant cooling control when the temperature measured by the controller temperature sensor 605 becomes lower than or equal to the finishing temperature (B) or lower than or equal to the outside air temperature (D), so that control of closing the second expansion device 602 is performed (step ST5). The same dust clogging avoiding control is performed in both operation modes, the cooling operation mode and the heating operation mode. For this reason, hereinafter, dust clogging avoiding control during the cooling operation mode will be described.

[Dust Clogging Avoiding Control of Second Expansion Device 602]

When the operation control unit 131 closes the second expansion device 602 (step ST5), dust clogging avoiding control is started. First, the foreign substance determination unit 132 determines whether or not following both conditions (3) and (4) are satisfied for a fixed time (two minutes, for example) (step ST21).

(3) The opening degree of the second expansion device 602 is instructed to have a closed state.

(4) The temperature measured by the controller temperature sensor 605 is lower than or equal to the dew point temperature (F) (35 degrees C., for example).

The determination in step ST21 is performed for the following purposes. That is, there may be a case where the temperature measured by the controller temperature sensor 605 decreases even after the refrigerant cooling control is finished and control is performed where the opening degree of the second expansion device 602 is brought into the closed state. In such a case, there is a possibility that the second expansion device 602 does not perform the action as controlled due to entry of a foreign substance. There may be also a case where the measured temperature does not return to the set temperature even after control is performed where the second expansion device 602 is brought into the closed state. Also in such a case, there is a possibility that operation failure occurs in the second expansion device 602 due to entry of a foreign substance. When the controller 130 is continuously cooled, thus the dew point temperature (F), which is lower than the finishing temperature (B) is reached, dew starts condensing. That is, the determination in step ST21 is performed for checking whether or not instruction to the second expansion device 602 is normally performed to prevent such condensation of dew on the controller 130.

When the above-mentioned both conditions (3) and (4) are satisfied for a fixed time, the foreign substance determination unit 132 determines that the second expansion device 602 is clogged with a foreign substance. When the foreign substance determination unit 132 determines that the second expansion device 602 is clogged with a foreign substance, the operation control unit 131 performs foreign substance release control (step ST22). That is, the operation control unit 131 performs control of opening the second expansion device 602 to release the foreign substance. Then, the operation control unit 131 returns the opening degree to the closed state again to increase the temperature of the controller 130. At this point of operation, to remove a foreign substance with more certainty, it is preferable that the operation control unit 131 bring the opening degree of the second expansion device 602 into a fully open state for a fixed time (30 seconds, for example) or longer, and then return the opening degree to the original opening degree. It is preferable that the dew point temperature (F) be determined on the basis of the value of the outside air temperature sensor 604 at this point of operation. It is not always necessary that an opening degree of the second expansion device 602 at which the second expansion device 602 is opened to remove a foreign substance from a flow passage is the fully open state.

On the other hand, when the above-mentioned either or both of conditions (3) and (4) are not satisfied in step ST21, the foreign substance determination unit 132 determines that the second expansion device 602 is not clogged with a foreign substance, and the second expansion device 602 performs the action as instructed. Then, dust clogging avoiding control is finished. Then, the controller 130 returns to step ST1 to determine whether or not cooling of the controller 130 is necessary, and processing illustrated in FIG. 6 and FIG. 8 is repeated.

When the foreign substance release control of the second expansion device 602 is performed by the operation control unit 131 (step ST22), after a lapse of a fixed time, the foreign substance determination unit 132 determines again whether or not the temperature measured by the controller temperature sensor 605 is lower than or equal to the dew point temperature (F) (step ST23). When the foreign substance determination unit 132 determines that the temperature measured by the controller temperature sensor 605 is higher than the dew point temperature (F), the operation control unit 131 determines that dust clogging of the second expansion device 602 is eliminated, and the dust clogging avoiding control is finished. Then, the controller 130 returns to step ST1 to determine whether or not cooling of the controller 130 is necessary, and processing illustrated in FIG. 6 and FIG. 8 is repeated.

On the other hand, when the temperature measured by the controller temperature sensor 605 remains at the dew point temperature (F) or lower even after the second expansion device 602 is opened and closed (YES in step ST23), the foreign substance determination unit 132 determines that the action of the second expansion device 602 is not normal. When the operation control unit 131 receives the determination result that the action of the second expansion device 602 is not normal, the operation control unit 131 causes the timer 134 to start counting and, at the same time, temporarily stops the air conditioning operation of the air-conditioning apparatus 500 (step ST24). In this embodiment, to temporarily stop means to stop the normal operation of the air-conditioning apparatus 500 for a fixed time (several seconds to several tens of seconds, for example).

Next, the operation control unit 131 determines whether or not the temporary stop is performed a set number of times or greater (step ST25). At this point of operation, the operation control unit 131 determines whether or not the number of times of stopping within a set grace time (30 minutes, for example) is the set number of times or greater. The grace time is measured by the timer 134, and the memory 133 stores the number of times of stopping during a period ranging from the start of counting performed by the timer 134 until the grace time elapses. The number of times of stopping stored in the memory 133 is updated by the operation control unit 131 at the time of temporarily stopping the operation in step ST24. At this point of operation, when the count of the timer 134 is longer than the grace time, the operation control unit 131 resets the number of times of stopping stored in the memory 133 and, at the same time, resets the count of the timer 134, so that the count of the grace period is started again.

When the current number of times of stopping is less than the set number of times (NO in step ST25), the operation control unit 131 restarts the operation of the air-conditioning apparatus 500 (step ST27). After the operation of the air-conditioning apparatus 500 is restarted, the processing returns to step ST4 illustrated in FIG. 6. Later, when the temperature measured by the controller temperature sensor 605 still remains at the dew point temperature (F) or lower, that is, when the second expansion device 602 does not perform the normal action, the operation control unit 131 temporarily stops the normal operation of the air-conditioning apparatus 500 again (step ST24).

On the other hand, when the current number of times of stopping is greater than or equal to the set number of times (YES in step ST25), there is no possibility that the air-conditioning apparatus 500 is recovered by the dust clogging avoiding control and hence, the operation control unit 131 performs abnormal stop of the operation of the air-conditioning apparatus 500 (step ST26). Specifically, the operation control unit 131 completely stops the air conditioning operation of the air-conditioning apparatus 500. Further, to notify an administrator of a fact that the air-conditioning apparatus 500 cannot be automatically recovered, the operation control unit 131 displays, on the notification unit 135, information that the air conditioning operation of the air-conditioning apparatus 500 is completely stopped.

In step ST5 of the refrigerant cooling control, it is sufficient that the opening degree of the second expansion device 602 is instructed to an extent that cooling of the controller 130 is not performed. It is not always necessary that the opening degree of the second expansion device 602 is an instruction value at which the second expansion device 602 is fully closed. In this case, it is sufficient to set the above-mentioned condition (3) to that the opening degree of the second expansion device 602 is instructed to be lower than or equal to a predetermined opening degree. The above-mentioned condition (4) may be a condition for determining a decrease of a temperature measured by the controller temperature sensor 605 from a temperature at which the refrigerant cooling control is finished (finishing temperature (B), for example), or a condition for determining no possibility for a temperature measured by the controller temperature sensor 605 to return to the set temperature set in advance.

The foreign substance release control performed in step ST22 has been described by illustrating the example case where the action is performed once where the opening degree of the second expansion device 602 is brought into the fully open state and then is brought into the closed state. However, control may be performed where opening and closing of the second expansion device 602 is repeated two or more times and then the opening degree of the second expansion device 602 is returned to the original opening degree. Alternatively, a following procedure may be adopted. When the condition in step ST23 is satisfied after the foreign substance release control is performed, the controller 130 repeats the processing in step ST22 and step ST23 several times. In a case where a dust clogging state is not eliminated even after the processing in step ST22 and step ST23 is repeated several times, the processing advances to step ST24.

As has been described above, in Embodiment 1, in the case where the temperature measured by the controller temperature sensor 605 is lower than or equal to the set temperature (dew point temperature (F), for example) in a state where the opening degree of the second expansion device 602 is controlled to an instruction opening degree that is lower than or equal to the set opening degree, the controller 130 performs foreign substance release control where the controller 130 increases the opening degree of the second expansion device 602 and then returns the opening degree of the second expansion device 602 to the instruction opening degree.

With such operations, when the second expansion device 602 that regulates the refrigerant flow rate in the refrigerant cooler 603 is clogged with a foreign substance, the air-conditioning apparatus 500 can release the foreign substance by opening the second expansion device 602. Consequently, dust clogging or other defects can be eliminated so that the action of the second expansion device 602 can be recovered to the normal state. As a result, it is possible to prevent a situation where the second expansion device 602 is prevented from closing, refrigerant continues to flow into the refrigerant cooler 603 and, as a result, the controller 130 is excessively cooled. Consequently, condensation of dew can be suppressed.

When the temperature measured by the controller temperature sensor 605 is lower than or equal to the set finishing temperature (finishing temperature (B), for example), the controller 130 controls the opening degree of the second expansion device 602 to an instruction opening degree that is lower than or equal to the set opening degree. With such an operation, when the controller 130 is cooled to the finishing temperature (B), the air-conditioning apparatus 500 causes cooling of the controller 130 to be finished so that it is possible to prevent the controller 130 from being excessively cooled.

The instruction opening degree that is lower than or equal to the set opening degree is the closed state. Consequently, the air-conditioning apparatus 500 can finish cooling with certainty, thus causing the temperature of the controller 130 to be recovered.

In the foreign substance release control, the controller 130 brings the opening degree of the second expansion device 602 into the fully open state, and then returns the opening degree of the second expansion device 602 to the instruction opening degree. Consequently, when the second expansion device 602 is clogged with a foreign substance, the air-conditioning apparatus 500 fully opens the second expansion device 602 so that it is possible to remove the foreign substance with more certainty.

A set temperature (dew point temperature (F), for example) at which the foreign substance release control is performed is a temperature that is lower than the finishing temperature (B), and at which dew condenses on the controller 130. Consequently, the air-conditioning apparatus 500 can detect the presence of a foreign substance with high accuracy.

When the temperature measured by the controller temperature sensor 605 is lower than or equal to a set temperature (dew point temperature (F), for example) after the foreign substance release control is performed, the controller 130 temporarily stops the operation of the compressor 101. With such an operation, the air-conditioning apparatus 500 can stop the air conditioning operation in a state where the temperature of the controller 130 reaches a dew point temperature or lower, and the temperature of the controller 130 can be increased by remaining heat of the semiconductor element or other element of the controller 130.

When the number of times of temporary stopping of the operation of the compressor 101 is less than the set number of times, the controller 130 restarts the compressor 101 after temporary stopping the compressor 101. With such an operation, the air-conditioning apparatus 500 can attempt action recovery by performing temporary stop and restart even when a cause that the second expansion device 602 does not perform the action as instructed is not clogging of a foreign substance (dust clogging). Further, when the action of the second expansion device 602 is recovered, the air-conditioning apparatus 500 can continue the operation while preventing the controller 130 from being excessively cooled.

The air-conditioning apparatus 500 further includes the notification unit 135 that notifies emergency stop. When the number of times of temporary stopping is greater than or equal to the set number of times, the controller 130 does not restart the operation of the compressor 101, but performs abnormal stop and, then, outputs information that the air-conditioning apparatus 500 is in an abnormal state. With such a configuration, when the air-conditioning apparatus 500 is in a state where the air-conditioning apparatus 500 cannot be automatically recovered, such as malfunction of the second expansion device 602, for example, the operation of the compressor 101 is completely stopped so that it is possible to prevent the controller 130 from being maintained excessively cooled.

The embodiment of the present invention is not limited to the above-mentioned embodiment, and various modifications are applicable. For example, specific numerical values of the respective temperatures and respective time periods in the above-mentioned description may be suitably set corresponding to an actual use conditions and other factors.

Further, the above-mentioned refrigerant cooling control and dust clogging avoiding control are also applicable to some refrigeration cycle apparatus as long as a circuit for cooling a controller includes an expansion device that regulates a refrigerant flow rate.

Embodiment 1 shows the example of the air-conditioning apparatus 500 including one heat-source-side unit 100 and two load-side units 300. However, the numbers of respective units are not particularly limited. In Embodiment 1, the description has been made by illustrating the example case where the present invention is applied to an air-conditioning apparatus 500 that can be operated in a state where the load-side units 300 are switched to either one of cooling or heating. However, an apparatus to which the present invention is applied is not limited to such an apparatus. The present invention is also applicable to other apparatus. For example, the present invention is also applicable to other apparatus that includes a refrigerant circuit that makes use of a refrigeration cycle, such as a refrigeration cycle apparatus and a refrigeration system where a load is heated by supplying capacity.

The invention claimed is:

1. A refrigeration cycle apparatus, comprising:
a refrigerant circuit through which refrigerant circulates, the refrigerant circuit including a compressor, a heat-source-side heat exchanger, a first expansion device, and a load-side heat exchanger;
a bypass pipe branched from a pipe between the compressor and the first expansion device, and connected to a pipe connected to a suction port of the compressor;
a second expansion device provided in the bypass pipe, the second expansion device being configured to regulate a flow rate of the refrigerant flowing through the bypass pipe;
a refrigerant cooler through which the refrigerant flows, the refrigerant cooler being provided in the bypass pipe;
a controller including a processor and a memory, the controller being configured to control the compressor, the first expansion device, and the second expansion device, the controller being cooled by the refrigerant cooler; and
a controller temperature sensor configured to measure a temperature of the controller,
the controller being further configured to
in a case that both (i) the temperature measured by the controller temperature sensor is determined to be lower than or equal to a set temperature and (ii) an opening degree of the second expansion device is determined to be instructed to an instruction opening degree that is lower than or equal to a set opening degree,
determine that the second expansion device is clogged with a foreign substance, and perform a foreign substance release control to increase the opening degree of the second expansion device and then return the opening degree of the second expansion device to the instruction opening degree.

2. The refrigeration cycle apparatus of claim 1, wherein, in a case where the temperature measured by the controller temperature sensor is lower than or equal to a set finishing temperature, the controller is configured to control the opening degree of the second expansion device to the instruction opening degree that is lower than or equal to the set opening degree.

3. The refrigeration cycle apparatus of claim 1, wherein the instruction opening degree corresponds to a closed state.

4. The refrigeration cycle apparatus of claim 1, wherein, in the foreign substance release control, the controller is configured to bring the opening degree of the second expansion device into a fully open state, and then is configured to return the opening degree of the second expansion device to the instruction opening degree.

5. The refrigeration cycle apparatus of claim 1, wherein the set temperature is defined by a temperature at which dew condenses on the controller.

6. The refrigeration cycle apparatus of claim 1, wherein the controller is configured to temporarily stop an operation of the compressor in a case where the temperature measured by the controller temperature sensor is lower than or equal to the set temperature after the controller performs the foreign substance release control.

7. The refrigeration cycle apparatus of claim 6, wherein, in a case where the number of times that the operation of the compressor is temporarily stopped is less than a set number of times, the controller is configured restart the compressor after the controller temporarily stops the compressor.

8. The refrigeration cycle apparatus of claim 7 further comprising
a notification lamp or monitor configured to notify emergency stop, wherein
the controller is configured to perform emergency stop of the operation of the compressor in a case where the number of times of temporary stopping is greater than or equal to the set number of times, and then is configured to output, to the notification lamp or monitor, information that the controller performs the emergency stop.

* * * * *